United States Patent [19]

Seiderman

[11] Patent Number: 5,608,781
[45] Date of Patent: Mar. 4, 1997

[54] METHOD OF ELIMINATING OR REDUCING CLONING OF ELECTRONIC IDENTIFICATION NUMBERS OF CELLULAR TELEPHONES

[76] Inventor: Abe Seiderman, 165 Solano Prado, Coral Gables, Fla. 33156

[21] Appl. No.: 421,835

[22] Filed: Apr. 12, 1995

[51] Int. Cl.$^6$ ..................................................... H04Q 7/22
[52] U.S. Cl. .............................. 379/59; 455/33.1; 379/58
[58] Field of Search ................................ 379/58, 59, 63; 455/33.1, 54.1, 89, 67.1

[56] References Cited

U.S. PATENT DOCUMENTS

| | | | |
|---|---|---|---|
| 5,337,345 | 8/1994 | Cassidy et al. | 379/58 |
| 5,388,148 | 2/1995 | Seiderman | 379/59 |
| 5,465,388 | 11/1995 | Zicker | 455/33.1 |
| 5,485,505 | 1/1996 | Norman et al. | 379/58 |

*Primary Examiner*—Curtis Kuntz
*Assistant Examiner*—G. J. Oehling
*Attorney, Agent, or Firm*—Robert C. Kain, Jr.

[57] ABSTRACT

The method of eliminating or reducing cloning of electronic identification serial numbers (herein ESN numbers) of cellular telephones involves programming the phone to generate and broadcast the valid ESN number only under certain circumstances. The method preventing utilizes either a standard cellular telephone or a cellular telephone with a uniquely configured user input device (for example, a credit card reader). The cell phone stores the valid ESN in one memory location and a pseudo ESN in another memory location. Upon "power up" of the cellular phone, the valid ESN number is stored in a third memory location and the pseudo ESN number is stored in the first memory location where the valid ESN number was originally stored. The pseudo ESN number is used during all cellular communications between the cellular telephone and the cellular telecommunications network unless certain user initiated events occur at the cell phone. One of the following conditions must occur at the cell phone in order to access the valid ESN number: the user must enter a predetermined user code; enter an emergency telephone number; enter a communications command substantially equivalent to the selection of one a plurality of predetermined telephone numbers or, in the special credit card cell phone, the user must enter valid credit card data information. Upon the occurrence of one of these conditions, the specially programmed cell phone copies the assigned or valid ESN number back into the first memory location. Thereafter, the cell phone utilizes the valid ESN number for the telecommunications link.

10 Claims, 10 Drawing Sheets

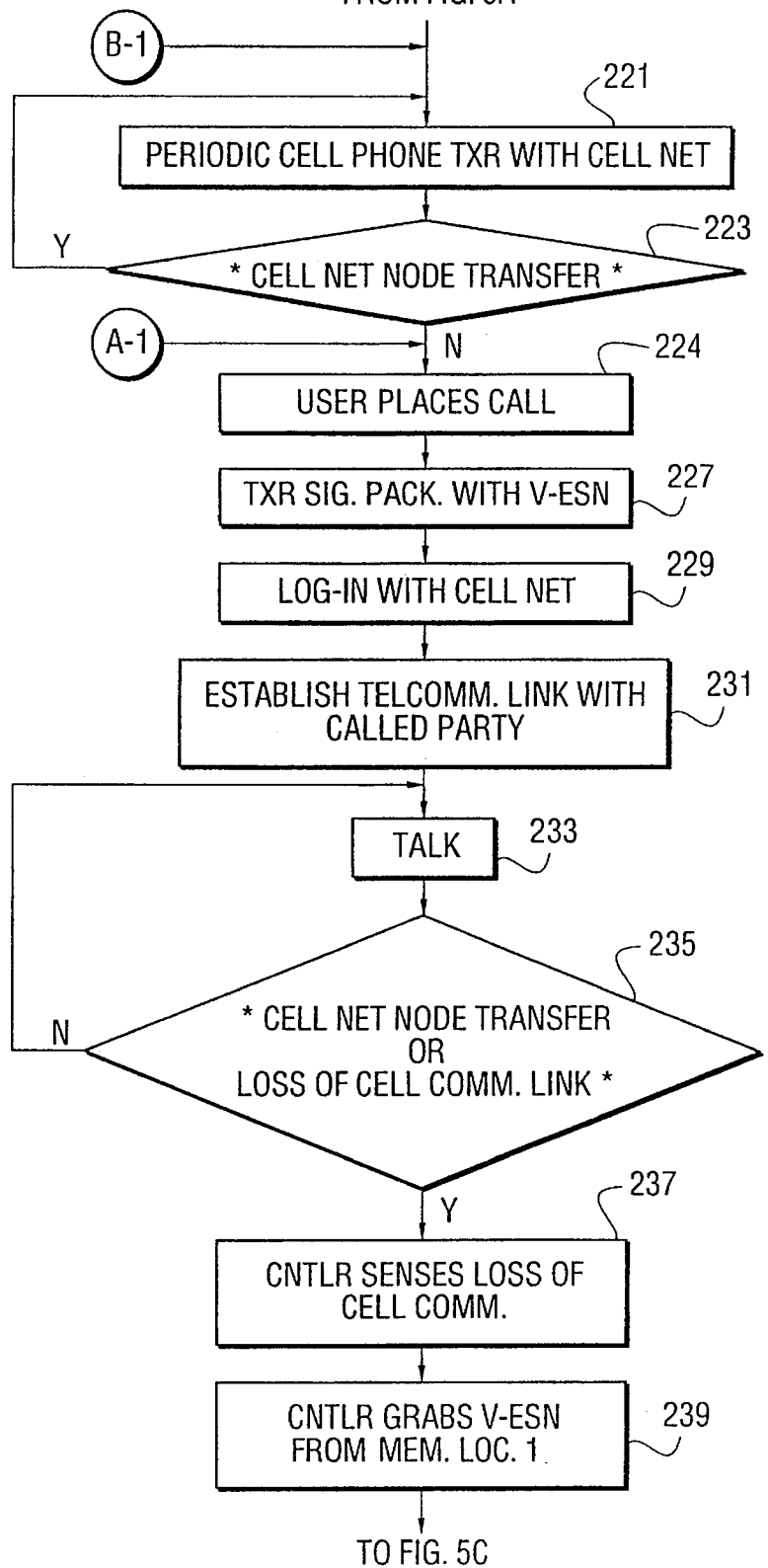

5,608,781

METHOD OF ELIMINATING OR REDUCING CLONING OF ELECTRONIC IDENTIFICATION NUMBERS OF CELLULAR TELEPHONES

BACKGROUND OF THE INVENTION

The present invention relates to a method of eliminating or reducing the unauthorized detection and subsequent cloning or unauthorized utilization of electronic serial numbers (ESN) which identify cellular telephones active in a cellular telecommunications network.

Cellular telephones commonly include a controller, such as a microprocessor, electronically coupled to a memory device. The memory stores not only software or programs which govern the operation of the cellular telephone but also an electronic serial number (ESN) that is initially stored in the cellular telephone upon purchase of the phone by a consumer. The ESN or electronic identification or serial number is assigned to that cellular telephone by the entity establishing the cellular telecommunications network. Each cellular telephone is assigned a unique ESN such that when a plurality of cellular telephones are ON or active in the cellular telecommunications net, the network can locate and place a telephone call to a particular cellular or cell phone by broadcasting the ESN of the cell phone throughout the network or a portion thereof.

Cellular telephones also customarily include user activated input devices such as keypads, recall key buttons and associated programs for automatically dialing a telephone number to be called by the cell phone (herein a "called number"). Cellular telephones also commonly include various other buttons which control the cellular communications such as the SEND and the END buttons which initiate and terminate a cellular telephone call.

Also, in customary applications, the cellular telephone logs into the cellular net by initially sending the cell phone's ESN to the cellular telecommunications network. The local antenna for the telecommunications cellular network receives this broadcast ESN number and the central office is then able to locate the cell phone at that particular node or zone in the cellular telecommunications network. Occasionally, such as when an automobile carrying the cell phone enters a tunnel or exits a particular cellular telecommunications node, the cellular phone recognizes that it has lost the telecommunications link with the net or network. The cell phone periodically generates the ESN and broadcasts the ESN to the net in order to reestablish the telecommunications link with the net. This occurs whether the user has established an active telephone communications link (i.e., during a "live" telephone call) or otherwise. In other words, the cell phone, when passing through a tunnel, commonly drops off the telecommunications cellular network. Upon exiting the tunnel, the cell phone, in a periodic manner, generates and broadcasts the ESN number. The telecommunications network picks up that broadcast ESN number and again logs in the cell phone into the network.

Commonly, a similar activity occurs when the automobile carrying the cellular telephone leaves one telecommunications network node or coverage area and there is no overlap between the next telecommunications node or area.

A problem exists in that electronic bandits monitor cellular telephone transmissions of phones leaving tunnels and exiting cellular telecommunication nodes. In particular, in New York City, electronic bandits locate listening devices at the exits of major tunnels. Since all cellular telephones that have previously "logged into" the cell net prior to entrance of the tunnel then attempt to reestablish that telecommunications link upon exiting the tunnel, the electronic listening devices capture valid ESN numbers generated by these cellular telephones as they exit the tunnel. Upon capturing the valid ESN numbers from one or more logged in cellular phones, the electronic bandits then sell and distribute those valid ESN numbers to other individuals. This is customarily done by a further telecommunications link to other criminal conspirators. The criminal conspirators, upon receipt of the "stolen" ESN numbers, then sell those numbers to other individuals who make multiple, unauthorized telephone calls using those cloned or copied ESN numbers. Since the bill to the user arrives sometimes 30 days after the initiation of a telephone call over the cellular network, the user may not discover the unauthorized and illegal cloning and use of the ESN for his or her cell phone for 30 days. As a result, there is a significant theft and unauthorized use of valid ESN numbers from cellular telephones in major metropolitan areas.

OBJECTS OF THE INVENTION

It is an object of the present invention to provide a method of eliminating or reducing unauthorized and illegal cloning and distribution of electronic identification serial numbers of cellular telephones.

It is a further objection of the present invention to prevent unauthorized detection of electronic serial numbers (ESND broadcast from cellular telephones by the broadcast of pseudo or false ESN numbers unless certain conditions occur at the cell phone.

It is another objection of the present invention to eliminate, reduce or prevent unauthorized detection of ESN by limiting the broadcast of a valid ESN number unless the cell phone has been properly activated by the user.

It is an additional object of the present invention to provide the user with the ability to activate his or her cell phone by entry of a predetermined user code, valid credit card data, emergency telephone number or a specific communications command representing stored telephone numbers.

It is a further object of the present invention to broadcast pseudo or false ESN numbers at times other than those special occurrences at the cell phone.

It is another object of the present invention to provide a time out function whereby the cell phone can log into the cell net with the valid ESN number for a period of time after the specified occurrence at the cell phone.

It is another object of the present invention to utilize the pseudo electronic serial number for the cell phone during most operations, thereby prohibiting unauthorized detection and cloning of the valid ESN and blocking cell net communications to the cell phone, and to utilize the valid ESN for a predetermined time period subsequent to specified activities at the cell phone, thereby permitting inbound calls to reach the cell phone through the cell net during those time periods.

SUMMARY OF THE INVENTION

The method of eliminating or reducing cloning of electronic identification serial numbers (herein ESN numbers) of cellular telephones involves programming the phone to generate and broadcast the valid ESN number only under certain circumstances. The method for preventing unauthorized detection utilizes either a standard cellular telephone or a cellular telephone with a uniquely configured user input device (for example, a credit card reader). The uniquely configured cellular telephone is a cell phone that includes a credit card data entry device. In either case, the cell phone stores the valid ESN in one memory location and a pseudo ESN in another memory location. Upon "power up" of the cellular phone, the valid ESN number is stored in a third memory location and the pseudo ESN number is stored in the first memory location where the valid ESN number was originally stored. The pseudo ESN number is used during all cellular communications between the cellular telephone and the cellular telecommunications network unless certain user initiated events occur at the cell phone. One of the following conditions must occur at the cell phone in order to access the valid ESN number: the user must enter a predetermined user code; enter an emergency telephone number; enter a communications command substantially equivalent to the selection of one a plurality of predetermined telephone numbers or, in the special credit card cell phone, the user must enter valid credit card data information. Upon the occurrence of one of these conditions, the specially programmed cell phone (programmed in accordance with the principles of this invention) copies the assigned or valid ESN number back into the first memory location. Thereafter, the cell phone utilizes the valid ESN number for the telecommunications link with the cellular telecommunications network. Upon completion of the telephone call, the pseudo ESN number is coped to the first memory location (the situs of the originally programmed valid ESN number). The cell phone may also be programmed to utilize a time-out routine during which the phone utilizes the valid ESN number and the phone receives inbound calls from the cell net.

BRIEF DESCRIPTION OF THE DRAWINGS

Further objects and advantages of the present invention can be found in the detailed description of the preferred embodiments when taken in conjunction with the accompanying drawings in which:

FIGS. 5A, 5B and 5C are flow chart diagrams which illustrate the operation of a common or prior art cellular telephone communications routine;

DETAILED DESCRIPTION OF THE PREFERRED EMBODIMENTS

The present invention relates to a method of eliminating or reducing cloning or preventing unauthorized detection of electronic serial numbers (ESN) commonly utilized by a cellular telephone in the cell phone communications routine with a cellular telecommunications network.

Figure 1:
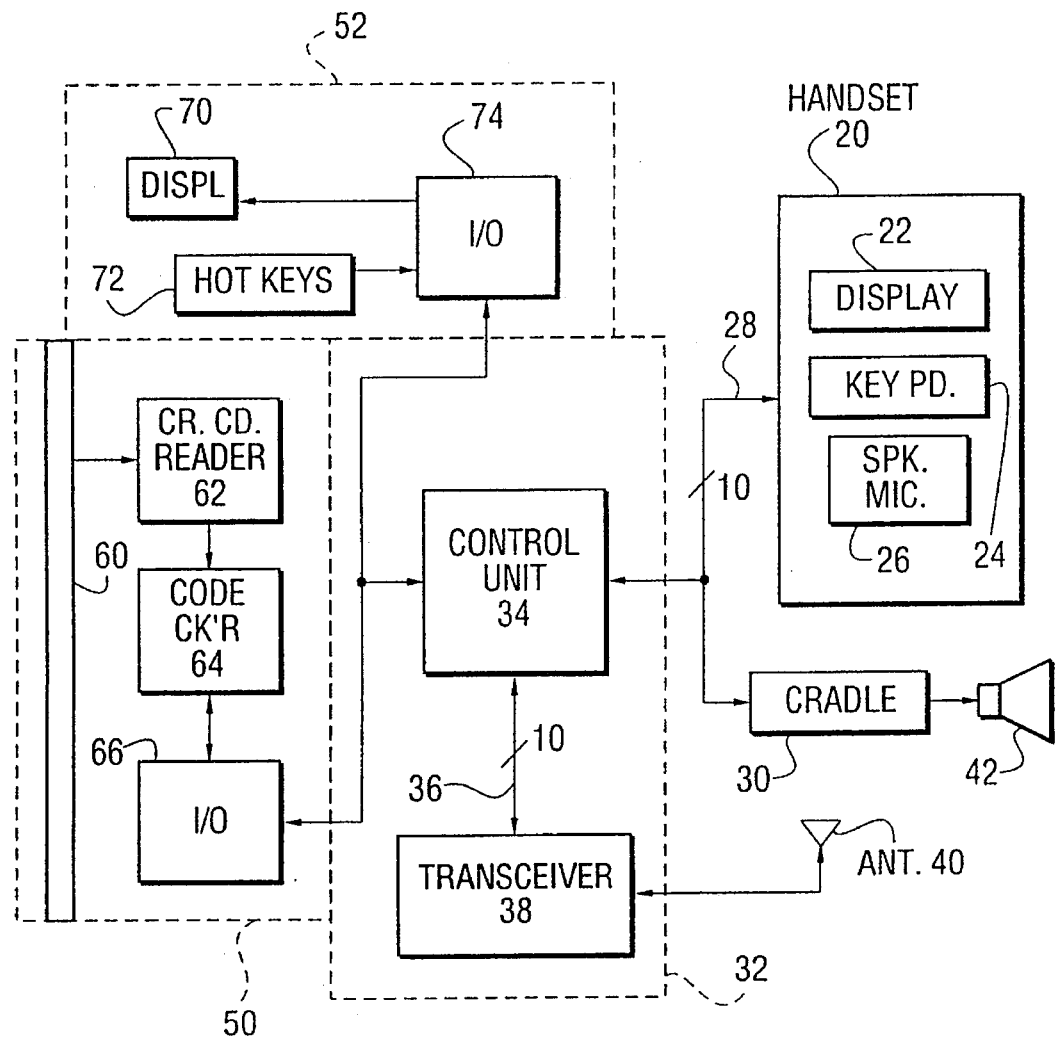
FIG. 1 diagrammatically illustrates the major hardware components for both the common cellular telephone (generally units 20, 30 and 32) and the special credit card cellular telephone (generally units 50 and 52)

FIG. 1 provides, in diagrammatic form, a block diagram of a cellular telephone and particularly a cellular telephone have a unique credit card reader.

The common cellular telephone includes a hand set 20 which includes display 22, a keypad 24 and a speaker/microphone 26. Hand set 20 is electrically connected via ten wire cable 28 to a cradle 30 and a control device 32 shown by dashed lines. Particularly, control device 32 includes a control unit 34. Control unit 34 is connected via ten wire cable or connection 36 to a transceiver 38. Transceiver 38 is electrically connected to antenna 40. Control unit 34 is also electrically connected to cradle 30. Cradle 30 is electrically connected to a speaker 42.

The cellular telephone illustrated in FIG. 1 has been supplemented by a credit card reader unit 50 designated by dashed lines and a user interface unit 52 designated by dashed lines. More particularly, the specially designed cellular telephone includes credit card reader unit 50 and user interface unit 52 and is described in greater detail in U.S. Pat. No. 5,388,148 to Seiderman issued Feb. 7, 1995, entitled Cellular Telephone Calling System Using Credit Card Validation. The specification of U.S. Pat. No. 5,388,148 is incorporated herein by reference thereto.

Credit card reader 50 specifically includes a slot 60 into and through which the user slides his or her credit card. Magnetic heads (not shown) pick up the stored magnetic codes on the credit card. These magnetic codes are demodulated and deciphered by credit card reader 62. The output of credit card 62 is applied to a local validation code checker 64. This local validation code checker locally determines whether the credit card data input by the user contains a correct date and that the credit card matches the appropriate coding algorithm. The term "local validation" refers to the validation of the credit card data at or near the cellular telephone. It does not include validation of the credit card number at the central office or at other locations via the cellular telecommunications network. Both validations are discussed in detail in U.S. Pat. No. 5,388,148 which is incorporated herein by reference thereto. The output of code checker 64 generally includes the credit card number and other pertinent information such as the identification code for the user. This electronic credit card data is applied to input/output device 66. I/O device 66 communicates with control unit 34.

The specially configured cellular telephone also includes a user interface 52. The user interface 52 includes a display 70, hot keys 72 and an input/output device 74. Again, this user interface is described in greater detail in U.S. Pat. No. 5,398,148 to Seiderman. Essentially, the user interface includes a display which will show, for example, emergency telephone numbers and frequently dialed free call or other stored telephone numbers accessible by the user. The "hot keys" interface 72 represents a plurality of buttons or keypad features whereby the user can select the emergency phone numbers, his or her special user code or a communications command which generates and represents a predetermined stored telephone number to be called by the cell phone. In any event, this input information obtained from the user is supplied to I/O device 74 and ultimately to control unit 34.

The common cell phone (generally units 20, 30 and 32) may be programmed to recognize special user inputs such as the input of emergency telephone numbers or special user codes or phone numbers. These constitute special events or occurrences discussed hereinafter.

Figure 2:
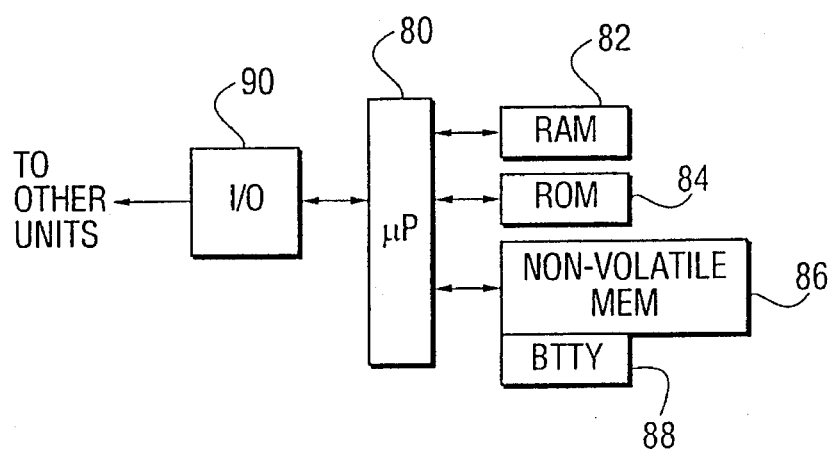
FIG. 2 diagrammatically illustrates the controller and associated memory in the cellular telephone.

FIG. 2 diagrammatically illustrates the major elements of control unit 34 in FIG. 1. In most cellular phones, control unit 34 includes a microprocessor 80, a random access memory (RAM) 82, a read only memory (ROM) 84 and a battery backed nonvolatile memory 86 powered by battery 88. Control unit 34 (FIG. 1) also includes an input/output device 90 (FIG. 2) such that the control unit can communicate in an electronic manner with other components of the cellular telephone.

Figure 3:
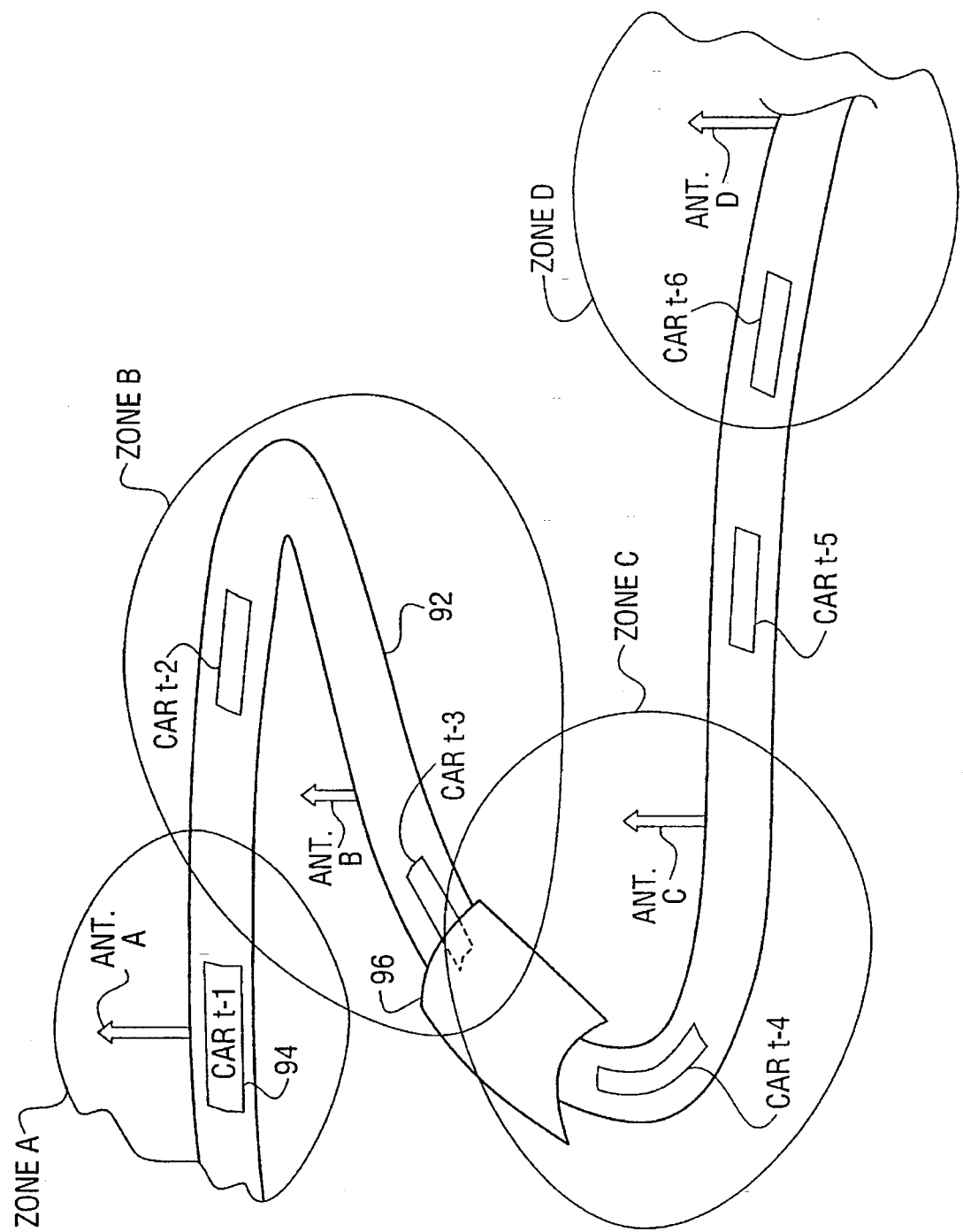
FIG. 3 diagrammatically illustrates a cellular telecommunications network having four nodes or zones.

FIG. 3 diagrammatically illustrates a common cellular telecommunications network. The network includes four zones or nodes, Zone A, Zone B, Zone C and Zone D each with a corresponding cellular antenna identified as antenna A, antenna B, antenna C and antenna D. These antennas are coupled to the central office via land lines, wires or other types of communications networks (not shown in FIG. 3). Together, the antennas establish zones or telecommunication network nodes which are diagrammatically illustrated as zones A, B, C and D in FIG. 3. A car 94 is located on road 92. The position of car 94 changes based on time period t-1, t-2, t-3, t-4, t-5 and t-6. Accordingly, car 94 is initially in position t-1 on road 92. This position is designated "car t-1" and corresponds to the car being placed in telecommunications node zone A. At time t-2, the car is in zone B. At time t-3, the car has entered tunnel 96. Accordingly, after the car enters tunnel 96, the telecommunications link between the cell phone in the car and the telecommunications network (zones A, B, C, and D) is broken. When the car exits tunnel 96 at time t-4, the cellular telephone in the car reestablishes the telecommunications link in zone C based on the position of antenna C.

In prior art systems, this reestablishment of the telecommunications link involves the broadcasting of a valid ESN number. By broadcasting a valid ESN number, the telecommunications network (zones A-D) can locate the cell phone in car position t-1, t-2, t-4 or t-6. In the absence of the broadcast of a valid ESN number by the cell phone, the telecommunications network cannot locate the car in position t-4. At position t-5, the car is intermediate zones C and D. Accordingly, there is no telecommunications link between the cell phone in the car at position t-5 since it is intermediate zones C and D. At the position indicated at time t-6, the car has reestablished the telecommunications link with the telecommunications network in zone D and particularly antenna D by broadcasting, in a prior art system, the valid ESN number.

Figure 4:
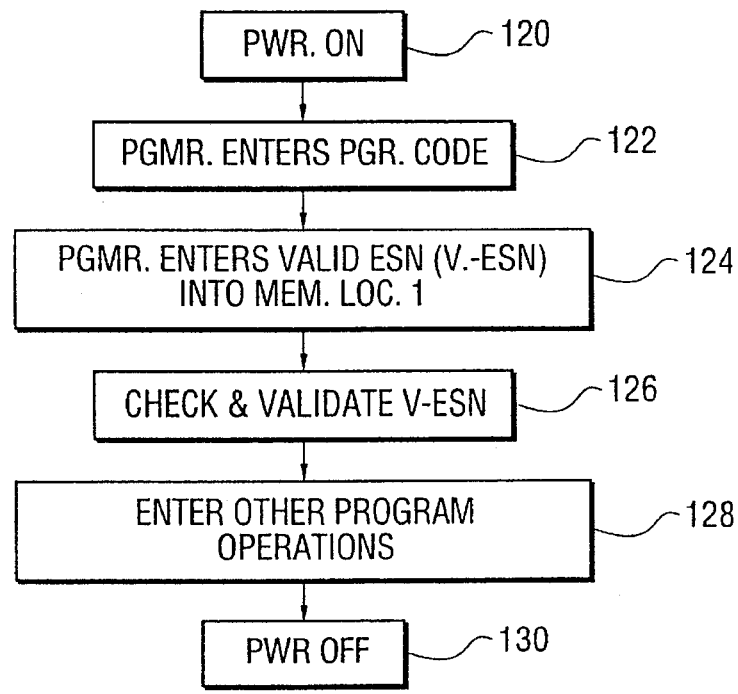
FIG. 4 is a flow chart which diagrammatically illustrates the initial programming and assignment of the electronic serial number in a cell phone.

FIG. 4 provides a block diagram of the initial programming of a cellular telephone. In step 120, the cellular telephone is powered up or turned ON. In step 122, the programmer enters a programmer's code which permits him or her to access and program the cellular telephone memory. In step 124, the programmer enters a valid electronic serial number which is identified in the drawings as V-ESN. This valid ESN number is stored in a particular memory location in the nonvolatile memory. Step 126, the programmer checks and confirms the V-ESN. To check and confirm the V-ESN, the controller 80 grabs the valid ESN from nonvolatile memory 86 and displays it on display 22. FIGS. 1 and 2 show the hardware for the system. In step 128, the programmer enters other programming codes into the particular cell phone. For example, the programmer may program the cell phone to block long distance phone numbers, thereby precluding the user from calling long distance. In step 130, the cell phone is turned OFF.

Figure 5A:
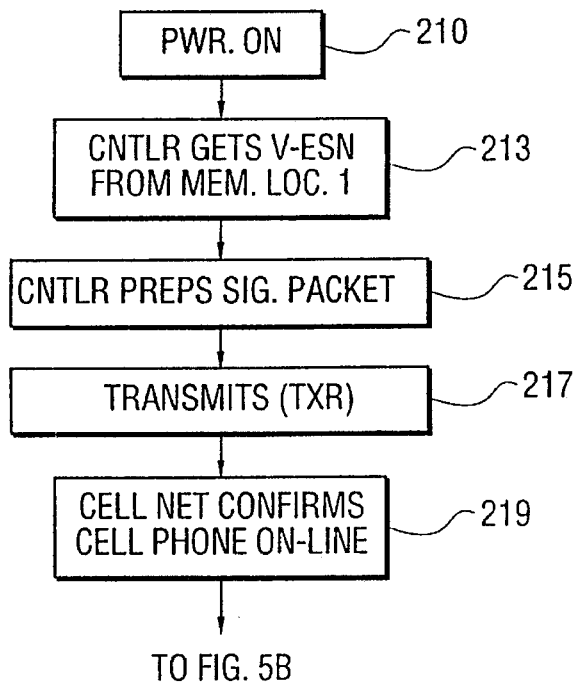
Figure 5C:
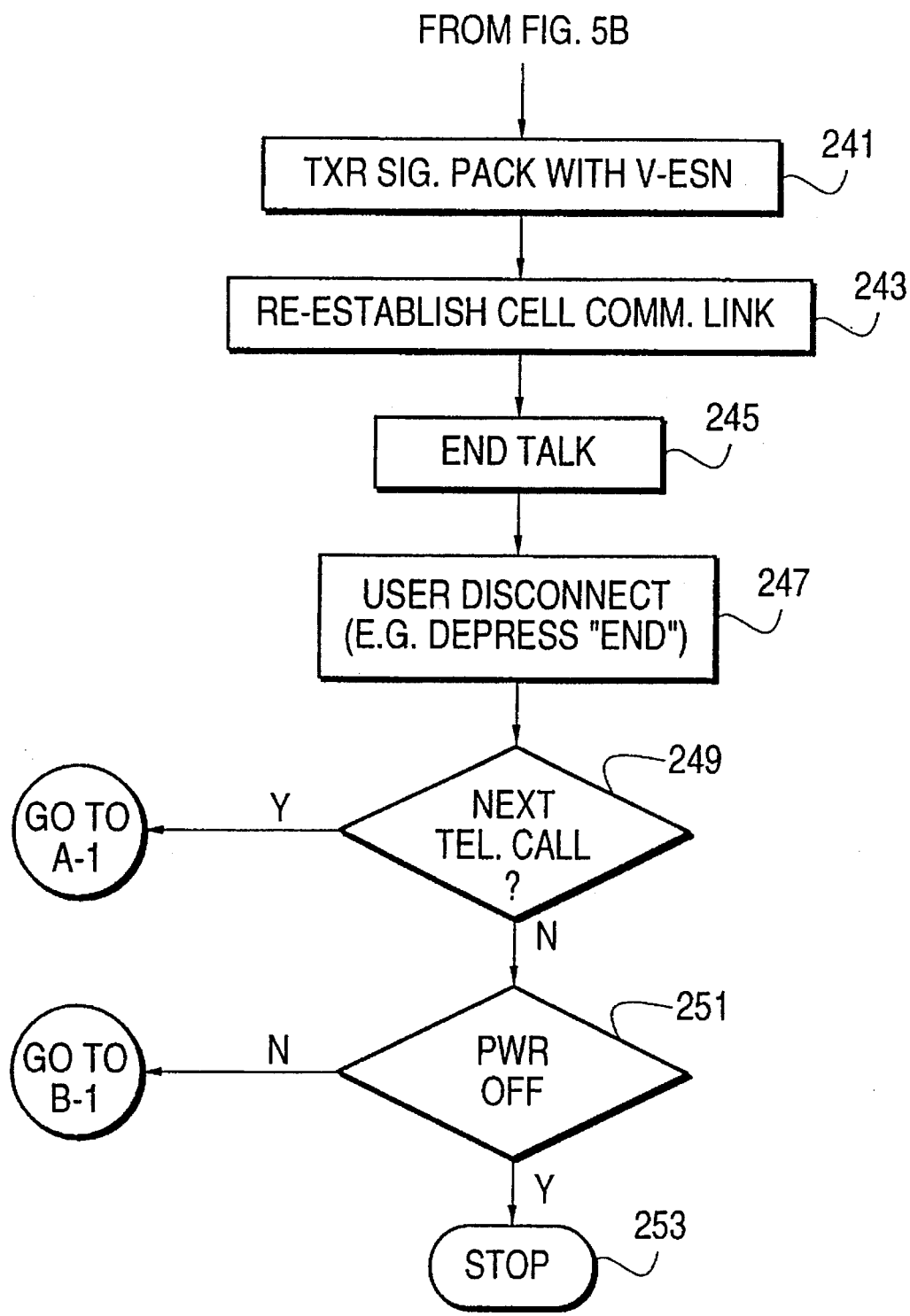

FIGS. 5A, 5B and 5C are block diagrams of the prior art telecommunications routine for a cellular telephone. In step 210, the cell phone is powered ON. In step 213, the controller (see controller 80 in FIG. 2) obtains the valid ESN number from memory location 1. There are many memory locations in the cell phone. Memory locations 1, 2 and 3 are specific addresses in the cell phone memory. In step 215, the controller prepares the signal packet (sig. pack.) to communicate with the cellular telecommunications network. In step 217, the cell phone transmits (TXR) the signal packet which includes the valid ESN to the cellular telephone communications network. This occurs utilizing transceiver 38 and antenna 40 shown in FIG. 1. As an example, with respect to FIG. 3, car 94 at position t-1 would generate a signal packet to antenna A wherein that signal packet includes the valid ESN. In step 219, the cellular telecommunications network confirms to the cell phone that the cell phone is ON-LINE or is logged into the net.

In FIG. 5B, and particularly in step 221, the cell phone periodically polls the cellular telecommunications network and sends the valid ESN number to confirm the location of the cell phone in the network. This confirmation of the location of the cell phone in the network enables the cellular telecommunications network to locate the cell phone (for example in zone A, zone B, zone C or zone D) thereby permitting incoming calls to the cell phone. Alternative communications routines (non-periodic polling) may be utilized by the cell phone. In decision step 223, the cell phone determines that there has been a transfer in the cellular telecommunications network between one node (for example zone C) to another node (for example, zone D). If the YES branch is taken from step 223, the cellular telephone regenerates the valid ESN number periodically such that the cell phone LOGS IN with the cellular telecommunications network. This occurs between position t-5 and position t-6 in FIG. 3.

From decision step 223, if the NO branch is taken, step 224 recognizes that the user has placed a call on the cell phone. In step 227, the transceiver generates a signal packet which includes the valid ESN number to the cellular telecommunications network. In step 229, the cell phone again logs into the cellular network with the valid ESN number. In step 231, a telephone communication link is established between the cell phone and the called party. Of course, the telephone communications link conveys and transmits a significantly larger amount of information than the polling activity in the telecommunications link when the user is not speaking via telephone in and through the telecommunications network. In step 233, the user is talking via the telecommunications network during a telephone communications link. In decision step 235, the cellular telephone determines whether the cellular phone has gone from one node or zone into a second zone (for example the transition between zone A and zone B in FIG. 3) or whether there has actually been a loss of the cellular telecommunications link between the cell phone and the network itself. This loss of communications would occur subsequent to car position t-3 and prior to car position t-4 when the car is inside tunnel 96 in FIG. 3. Also, this occurs when the car is at position t-5 between zones C and D in FIG. 3. If a NO branch is taken, the communications routine simply returns to a point immediately prior to talk step 233. If the YES branch is taken, the communications protocol executes step 237 wherein the controller senses the loss of the telecommunications link. In step 239, the controller grabs or obtains the valid ESN number from memory location 1.

In FIG. 5C, and particularly step 241, the cell phone transmits a signal packet with the valid ESN number to the cellular telecommunications network. In step 243, the telecommunications telephone link is reestablished between the cell phone and the network. In step 245, the user stops talking. In step 247, the user disconnects the telecommunications link by depressing a communications command button END. In decision step 249, the cell phone determines whether the user has activated another call. If YES, the program jumps back to jump point A-1 immediately prior to step 224. If the NO branch is taken, the cell phone in step 241 determines whether the user has depressed the power OFF command button. If the NO branch is taken, the program jumps to jump point B-1 immediately prior step 221, the periodic polling between the cell phone and the telecommunications network. If the YES branch is taken, the program stops as noted in step 523.

Figure 6A:
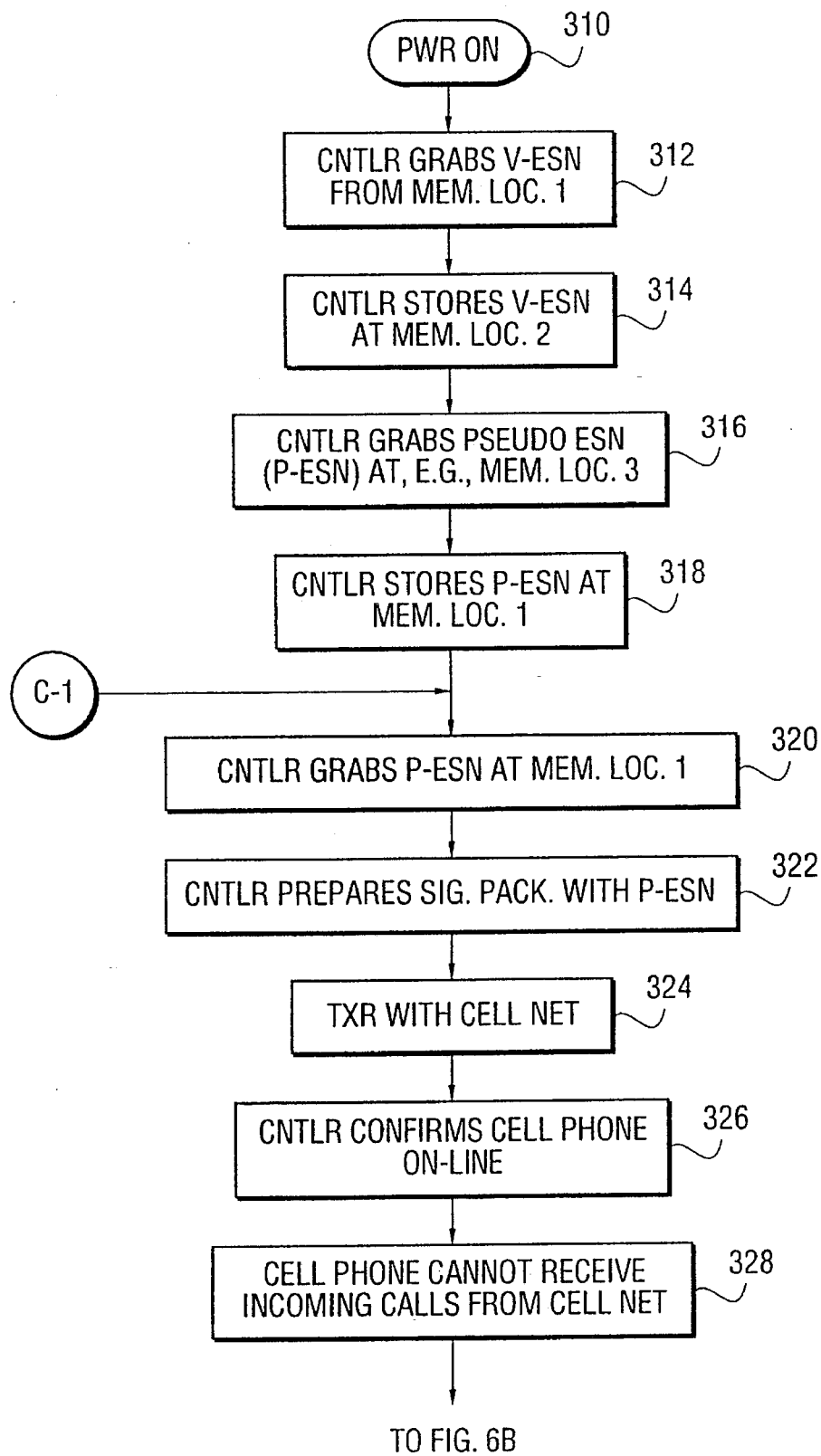
FIGS. 6A, 6B and 6C are flow chart diagrams which illustrate the cellular telephone communications routine in accordance with the principles of the present invention.
Figure 6B:
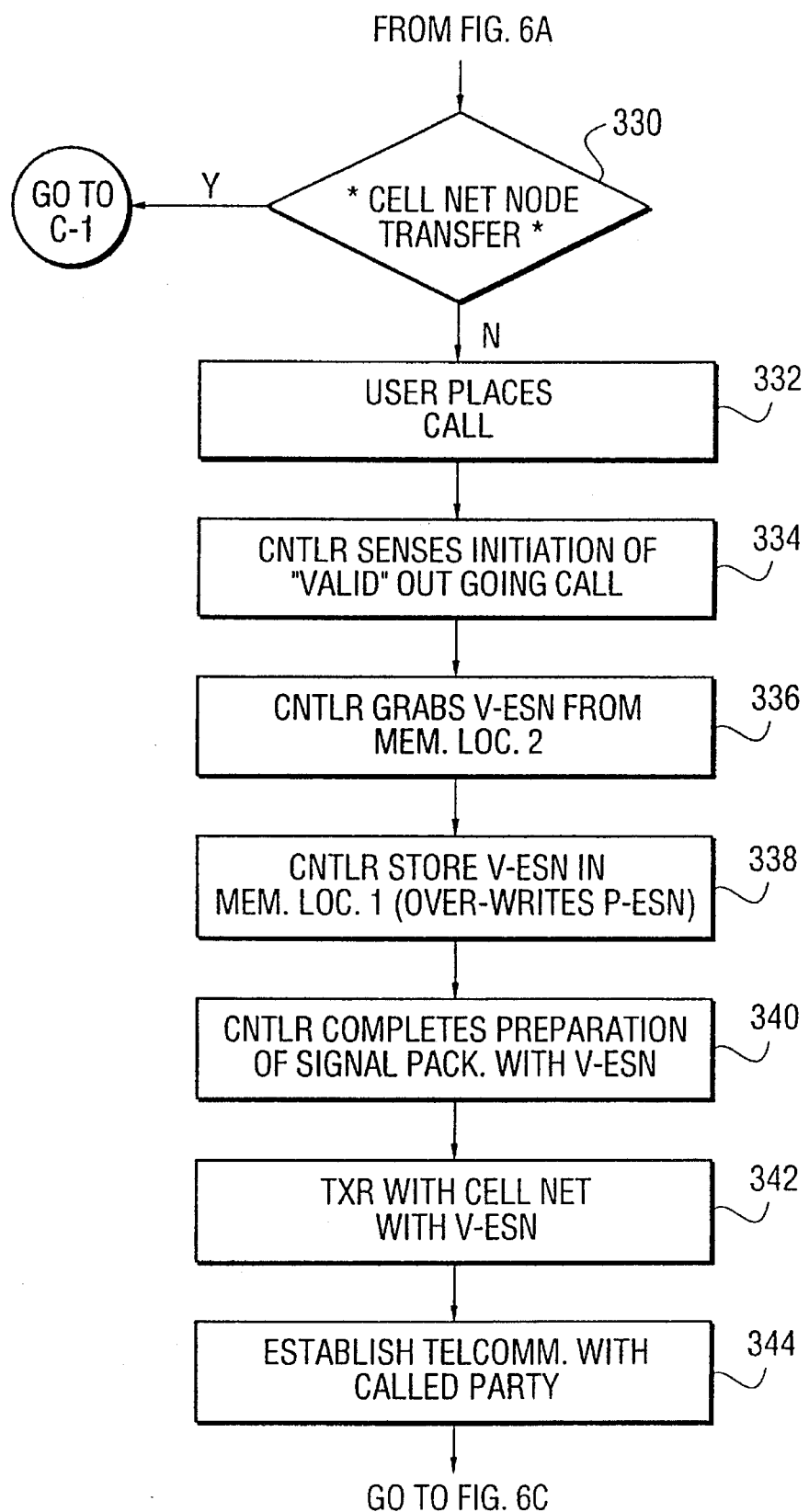
Figure 6C:
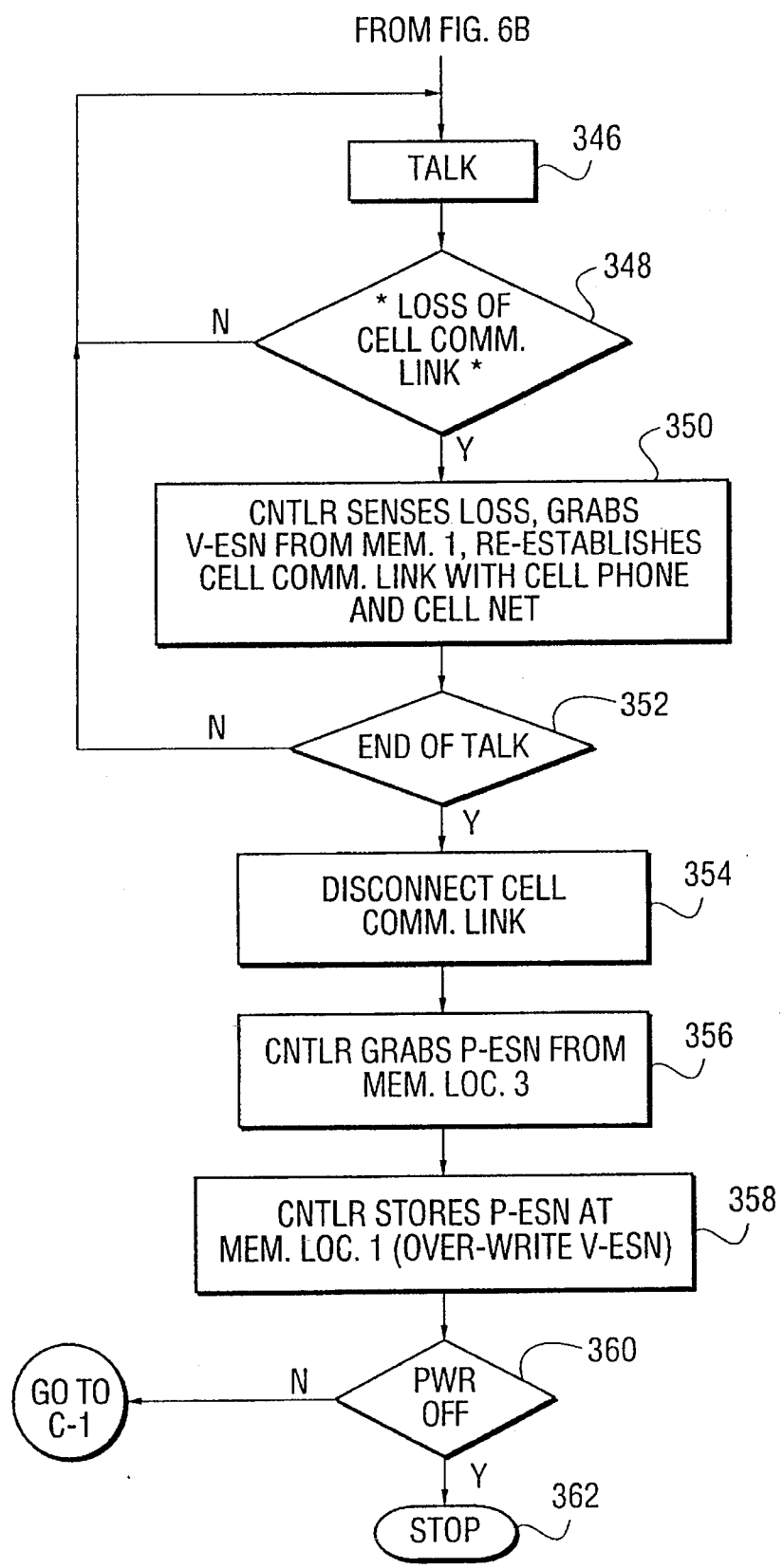

FIGS. 6A, 6B and 6C provide a flow chart or block diagram of the cellular telephone communications routine in accordance with the principles of the present invention. In step 310, the cell phone is powered ON. In step 312, the controller grabs the valid ESN number from memory location 1. It should be remembered that there are numerous memory locations in memory 82,84 and 86 shown in FIG. 2. In step 314, the controller stores the valid ESN number at a second memory location such as memory location 2. In step 316, the controller grabs a pseudo or false ESN number at a third memory location. Alternatively, the controller could simply generate a false ESN number by using an algorithm to modify the valid ESN number. In step 318, the controller stores the pseudo or P-ESN number at memory location 1. This overwrites the valid ESN number with the pseudo or false ESN number at that memory location. In step 320, the controller grabs the pseudo ESN number at memory location 1. In step 322, the controller prepares a signal package for transmission to the cellular telecommunications network with the pseudo or false ESN number. In step 324, the cell phone communicates with the cellular network using the P-ESN or false ESN number. In step 326, the controller confirms the telecommunications link with the cellular network. This confirmation is simply that the network has not rejected the signal packet sent out by the cellular phone. In step 328, it is recognized that the cellular telecommunications network cannot transfer, locate or direct inbound calls directed towards the cell phone because the cell phone is not using the valid or correct ESN number in the cell net. The cell phone has logged into the cellular telecommunication network using a false or pseudo ESN number.

In FIG. 6B and particularly in decision step 330, a determination is made whether the cell phone has been transferred from one cellular node (zone A) to another cellular zone (zone B). If so, the communications protocol takes the YES branch and jumps to jump point C-1 immediately prior step 320. In step 320, the controller utilizes the false or pseudo ESN number to reestablish communications with the cell net. If the NO branch is taken from decision step 330, in step 332, the user places a call with the cell phone.

In prior art applications, the call placement generally follows the following steps shown in the Call Placement Table 1.

CALL PLACEMENT TABLE 1 (Prior Art)

1. User enters telephone number on keypad
2. Presses "SEND" button—command
3. Controller prepares signal packet
4. Grabs valid ESN from memory location 1 to prepare packet
5. Controller initiates telecommunications link with cellular network with V-ESN However, in the present invention, in step 334, the controller senses the initiation of a valid outgoing call initiated by the user. The valid outgoing call is locally validated based on the following Call Placement Table 2.

CALL PLACEMENT TABLE 2 (Invention)

Option A
1. User swipes credit card
2. Local card validation at cell phone unit
3. User inputs telephone number
4. Controller prepares batch communication file with credit card number, special cell net phone number and called party's number Option B
1. User inputs special phone numbers, e.g. "0", "911"
2. Controller prepares batch communications file with special called party's number, e.g. the operator Option C
1. User strikes "hot button" or pre-programmed button on cell phone unit
2. Controller prepares batch communications file with special, stored called party's number, e.g. the home office Option D
1. User inputs special operations code, e.g., a 4 digit user code
2. Controller "clears" next telephone call
3. User "dials" called party's telephone number As set forth above in Call Placement Table 2 describing the invention, a valid outgoing call from the cell phone occurs when a locally validated credit card data is input into the device, or when the user inputs a special phone number such as to the operator or to emergency 911 via keypad 24 (FIG. 1), or the user strikes a hot button in interface unit 72 (FIG. 1) representing pre-programmed phone numbers. Alternatively, in option D, the user inputs a special operations code unique to the user. This unique user code would clear the next phone call from the cell phone.

Returning to FIG. 6B and in step 336, the controller grabs or obtains the valid ESN number from memory location 2. In step 338, the controller stores the valid ESN number in the first memory location (mem. loc. 1), thereby overwriting the pseudo or false ESN at that memory location. In step 340, the controller completes the preparation of the signal packet with a valid ESN number. In step 342, the transceiver transmits to the cellular telecommunications network the signal packet with the valid ESN number. This logs the cell phone into the network such that the network can then call or associate any outgoing calls from the cell phone with that particular cell phone. In step 344, a telecommunications telephone path is established between the cell phone and the called party.

In FIG. 6C, and particularly in step 346, the user talks during the telephone communication link. In decision step 348, the cell phone determines whether the telecommunications link between the cell phone and the network has failed. This failure occurs, for example, when the car 94 enters tunnel 96 (FIG. 3) or when the car at position t-5 is intermediate node or zone C and node or zone D. If the NO branch is taken from decision step 348, the system simply returns to a point immediately prior talk step 346. If the YES branch is taken from decision step 348, the system executes step 350 wherein the controller senses the loss of the communications link, grabs the valid ESN number from memory location 1 and reestablishes the cellular telecommunications link between the cell phone and the cell net. Decision step 352 determines whether the user has stopped talking. If the NO branch is taken, the system jumps to a point immediately proceeding talk step 346. If the YES branch is taken, the system executes step 354 which disconnects or drops the cellular telecommunications link between the cell phone and the cell net. In step 356, the controller grabs or obtains the pseudo or false ESN number from the third memory location. In step 358, the controller stores the false or pseudo ESN number at memory location 1 thereby overwriting the valid or V-ESN number at that memory location. In decision step 360, the system determines whether the user has powered OFF the cell phone. If the NO branch is taken, the system jumps to jump point C-1 immediately proceeding step 320 wherein the controller grabs the pseudo ESN at memory location 1 in order to establish the cellular link with the cell net. If the YES branch is taken from decision step 360, the system stops as shown in step 362.

The following ESN Transmit Table provides a correspondence between the transmission of the false or pseudo ESN number or the valid ESN number for various car positions shown in FIG. 3.

ESN TRANSMIT TABLE

| Position | Zone | Transmit ESN status |
|---|---|---|
| No call pending | | |
| t-1 | A | periodic send P-ESN |
| t-2 | B | same |
| t-3 | B | same |
| t-4 | C | immediate send P-ESN |
| t-5 | open | grab P-ESN |
| t-6 | D | immediate send P-ESN |
| Call pending | | |
| t-1 | A | initiate tel comm with V-ESN |
| t-2 | B | cellular tel comm underway |
| t-3 | B | cell tel comm broken |
| t-4 | C | immediate send V-ESN |
| t-5 | open | grab V-ESN |
| t-6 | D | immediate send V-ESN |

For example at car position t-1, the cell phone of the present invention utilizes the pseudo or P-ESN number to communicate with the cell net in zone A. At time t-4, when the car exits tunnel 96, the pseudo ESN number is transmitted from the cell phone to the cellular net. At t-5, the cell phone looses the link between it and the cell net. At time t-6, in zone D, the P-ESN number is utilized to establish the telephone communications link. During this time frame, the cell phone cannot receive incoming calls from the cellular telecommunications network because the cell phone is not properly logged into the cell net. In fact, the cell net cannot locate the cell phone within zones A, B, C and D because the cell phone has not used the valid ESN number. Hence, the ESN Transmit Table above shows a "no call pending" operation which differs from the "call pending" operation. In the call pending mode of the ESN Transmit Table, at time t-1 in zone A, the cell phone utilizes the valid or V-ESN number to establish the telecommunications link with the cell net. At time t-4 when the cell phone exits tunnel 96, the phone generates and sends the valid ESN number. If an electronic bandit is monitoring cellular telephone transmissions at the exit of tunnel 96, in the call pending situation, the electronic bandit may detect the genuine ESN number since the cell phone, when logging into the cell net at time t-4 utilizes a valid ESN number. However, since most cell phones are not always in the talk or call pending mode, upon exiting tunnel 96, the bandit may detect the pseudo ESN broadcast by the cell phone. The broadcast of the pseudo ESN during the non-call pending periods eliminates or at least significantly reduces unauthorized detection, cloning and further unauthorized use of valid ESN numbers.

Figure 7A:
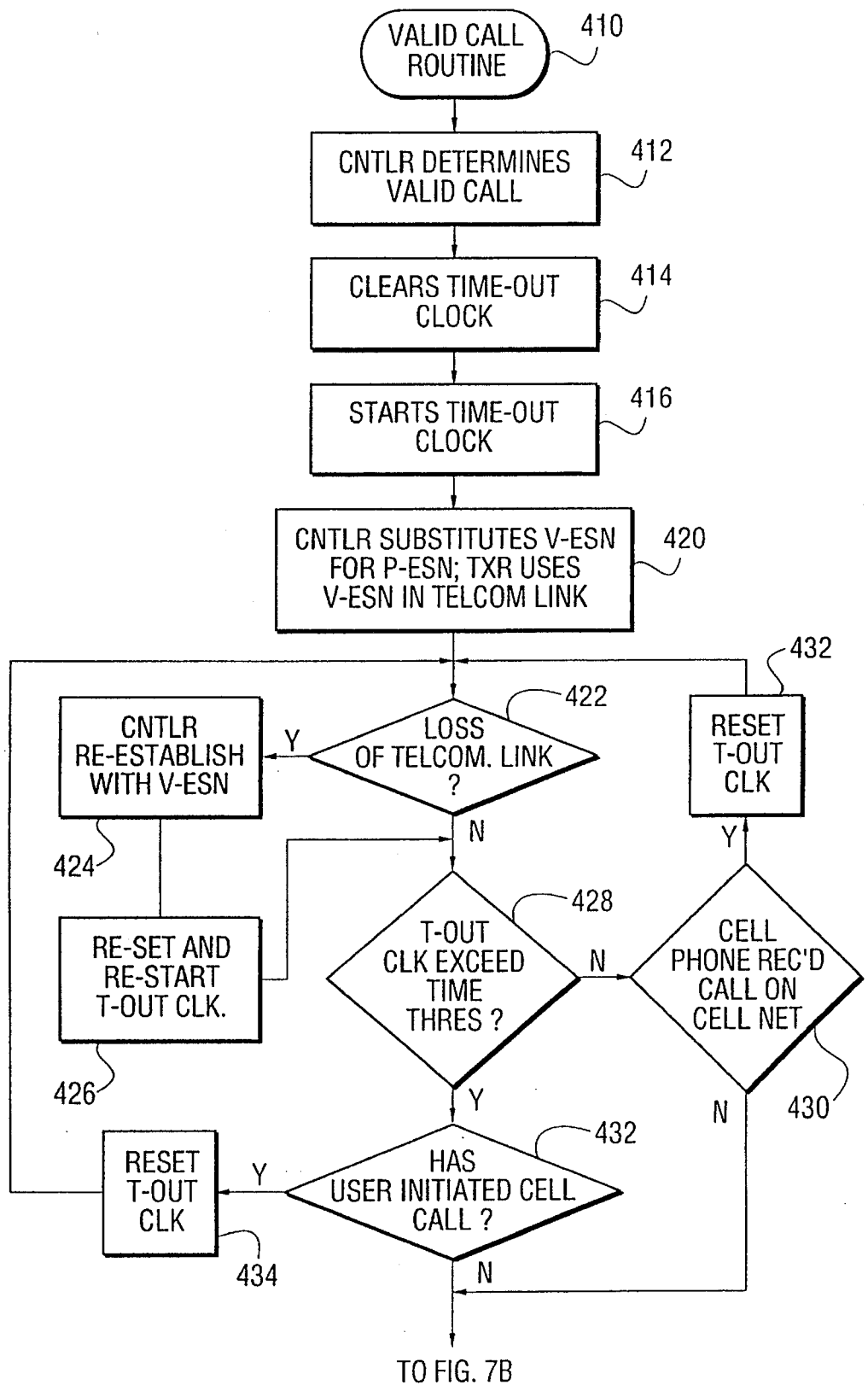
FIGS. 7A and 7B are flow chart diagrams which illustrate a time out routine for the cellular telephone communications routine in accordance with the principles of the present invention.
Figure 7B:
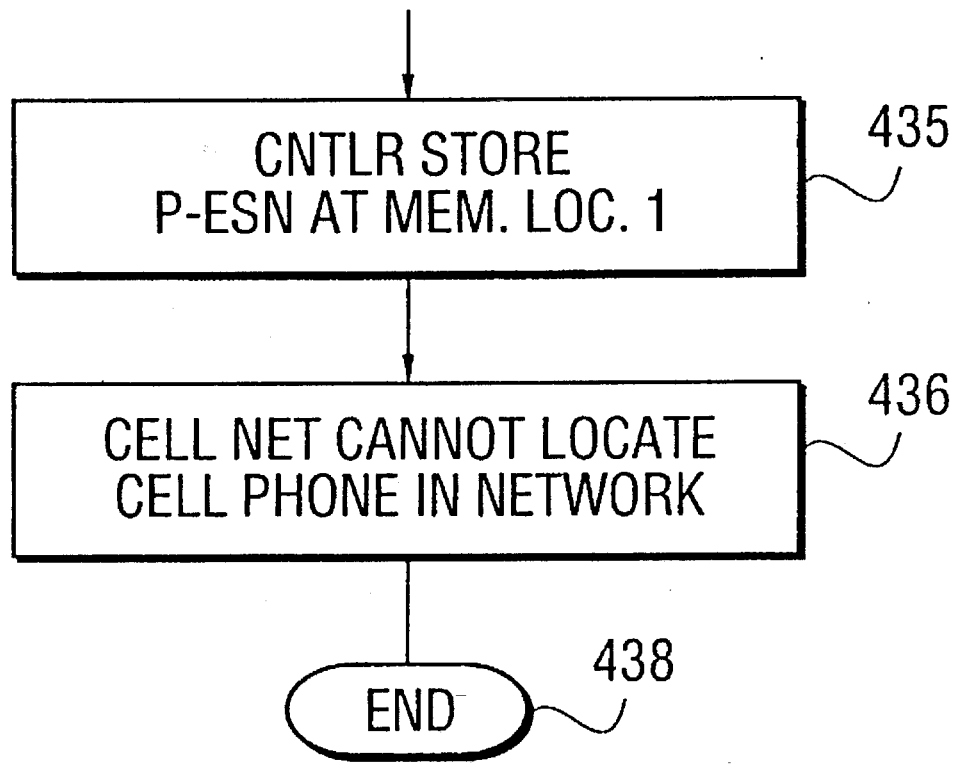

FIG. 7A provides a block diagram of a new cellular telecommunications routine which includes a time out function. The routine assumes the occurrence of a valid cellular call from the user at item 410. In step 412, the controller determines that the user has activated a valid call from the cell phone. In step 414, the controller clears a time out or a count down clock. In step 416, that time out clock is started by the controller. In step 420, the controller substitutes the valid ESN number for the pseudo ESN number at memory location 1. Thereafter, the controller executes the customary communications routine and prepares a signal packet for the transceiver using the valid ESN number. The telecommunications link is established between the cell phone and the cell network using that valid ESN number in step 420. After step 420, the routine executes decision step 422. This step determines whether there has been a loss of the telecommunications link between the cell phone and the cell network. If the YES branch is taken in step 424, the controller reestablishes communication using the valid ESN number. In step 426, the controller resets and restarts the time out clock. The routine then follows the NO branch from decision step 422. In decision step 428, the system determines whether the time out clock has exceeded a pre-programmed time threshold. If a countdown counter is utilized, the occurrence of zero in the countdown clock or counter is the equivalent of a time out clock which counts up to a predetermined number. If the NO branch is taken, the system determines, in decision step 430, whether the cellular phone has received a call from the cell net. If the YES branch is taken, step 432 resets the time out clock. This time out feature enables the user to enter, for example, a user selectable control number such that he or she can receive a call from the cellular network during a predetermined time. For example, the system may be set such that the cell phone is capable of receiving telephone numbers for five minute or ten minute periods. After the expiration of that five or ten minute period (a preprogrammed, predetermined time period), the cell phone then uses the pseudo or false ESN number to log in and out of the cellular network. This feature is represented by the NO branch from decision step 430. In the NO branch, the time out clock has run down and the cellular phone has not received an incoming call from the cell net. The NO branch from decision step 430 leads to a point immediately after decision step 432.

Returning to the YES branch from decision step 428, the system determines that the user has initiated a cellular call from the cellular phone. If the YES branch is taken, step 434 resets the time out clock and the system recycles to a point immediately prior to decision step 422 which determines whether the cellular telecommunications link is still established. Returning to the NO branch from decision step 432 when the user has not initiated a telephone call, the system jumps to step 435. In step 435, the controller stores the false or pseudo ESN number at memory location 1 thereby overwriting the valid ESN number. In step 436, the cellular network cannot locate the cell phone in the network because the cell phone is now using the pseudo ESN number. In step 438, the time-out communications routine ends.

The claims appended hereto are meant to cover modifications and changes within the spirit and scope of the present invention.

What is claimed is:

1. Method for preventing unauthorized detection of electronic serial numbers stored in and broadcast from one cellular telephone of a plurality of cellular telephones to a cellular telecommunications network during a telecommunications link comprising the steps of:

providing a cellular telephone with a controller, a memory with a plurality of memory locations for storing a plurality of electronic serial numbers, an input device for entry of at least telephone numbers and communication commands all electronically connected together and a transceiver electronically connected to said controller;

initially assigning and storing, in one memory location, an assigned electronic serial number unique to said one cellular telephone as compared with other electronic serial numbers assigned to other cellular telephones of said plurality of cellular telephones, said assigned electronic serial number enabling said cellular telecommunications network to locate and call said one cellular telephone during said telecommunications link;

storing said assigned electronic serial number in another memory location;

storing a pseudo electronic serial number at said one memory location thereby overwriting said assigned electronic serial number stored thereat;

determining when at least one condition of the following group of conditions occurs:
entry of a predetermined user code;
entry of an emergency telephone number;
entry of a communications command substantially equivalent to selection of one
of a plurality of predetermined telephone numbers stored in said memory at
respective memory locations;

upon the determination of an occurrence of one of the conditions, copying said assigned electronic serial number into said first memory location and permitting cellular telecommunications links utilizing said assigned electronic serial number;

in the absence of determining an occurrence of one of the conditions, using said pseudo electronic serial number during all cellular telecommunications links between said one cellular telephone and said cellular telecommunications network.

2. A method as claimed in claim 1 wherein in the absence of determining an occurrence of one of the conditions, said cellular telephone broadcasts said pseudo electronic serial number to said cellular telecommunications network and consequently, said cellular telecommunications network cannot locate or call said one cellular telephone during said telecommunications link.

3. A method as claimed in claim 1 including the step of permitting the usage and broadcast of said assigned electronic serial number during a predetermined period of time started after the determination of the occurrence of one of the conditions thereby enabling location and calling of said one cellular telephone during said telecommunications link from said cellular telecommunications network.

4. Method for preventing unauthorized detection of electronic serial numbers stored in and broadcast from one cellular telephone of a plurality of cellular telephones to a cellular telecommunications network during a telecommunications link comprising the steps of:

providing a cellular telephone with a controller, a memory with a plurality of memory locations for storing a plurality of electronic serial numbers, an input device for entry of at least telephone numbers, communication commands and credit card data, electronics coupling said controller, memory and input device, and a transceiver electronically connected to said controller;

initially assigning and storing, in a first memory location of said plurality of memory locations, an assigned electronic serial number unique to said one cellular telephone as compared with other electronic serial numbers assigned to other cellular telephones of said plurality of cellular telephones, said assigned electronic serial number enabling said cellular telecommunications network to locate and call said one cellular telephone during said telecommunications link;

copying said assigned electronic serial number via said controller into a second memory location;

storing a pseudo electronic serial number at said first memory location thereby over-writing said assigned electronic serial number stored thereat;

determining when one condition of the following group of conditions occurs via said input device and said controller:
entry of credit card data;
entry of a predetermined user code;
entry of an emergency telephone number;
entry of a communications command substantially equivalent to selection of one
of a plurality of predetermined telephone numbers stored in said memory at
respective memory locations;

upon the determination of an occurrence of one of the conditions in the previous determining step, copying said assigned electronic serial number from said second memory location into said first memory location and, initiating a cellular telecommunications link via said controller and transceiver utilizing said assigned electronic serial number; and, in the absence of determining an occurrence of one of the conditions in the previous determining step, using said pseudo electronic serial number during all cellular telecommunications links between said one cellular telephone and said cellular telecommunications network.

5. A method as claimed in claim 4 including the step of locally validating said credit card date during said determining step.

6. A method as claimed in claim 4 wherein in the absence of determining an occurrence of one of the conditions in said determining step, said cellular telephone broadcasts said pseudo electronic serial number to said cellular telecommunications network and consequently, said cellular telecommunications network cannot locate or call said one cellular telephone during said telecommunications link.

7. A method as claimed in claim 4 including the step of permitting the usage and broadcast of said assigned electronic serial number during a predetermined period of time after the determination of the occurrence of one of the conditions in said determining step thereby enabling location and calling of said one cellular telephone during said telecommunications link from said cellular telecommunications network.

8. A method as claimed in claim 7 wherein in the absence of determining an occurrence of one of the conditions in said determining step, said cellular telephone broadcasts said pseudo electronic serial number to said cellular telecommunications network and consequently, said cellular telecommunications network cannot locate or call said one cellular telephone during said telecommunications link.

9. A method as claimed in claim 8 including the step of permitting the usage and broadcast of said assigned electronic serial number during a predetermined period of time after the determination of the occurrence of one of the conditions in said determining step thereby enabling location and calling of said one cellular telephone during said telecommunications link from said cellular telecommunications network.

10. Method for preventing unauthorized detection of electronic serial numbers stored in and broadcast from one cellular telephone of a plurality of cellular telephones to a cellular telecommunications network during a telecommunications link, wherein said cellular telephone includes a controller, a memory with a plurality of memory locations for storing a plurality of electronic serial numbers, an input device for entry of at least telephone numbers, communication commands and credit card data, all electronically connected together, and a transceiver electronically connected to said controller, the method comprising the steps of:

initially assigning and storing, in a first memory location, an assigned electronic serial number unique to said one cellular telephone, said assigned electronic serial number enabling said cellular telecommunications network to locate and call said one cellular telephone during said telecommunications link via said cellular telecommunications network;

storing a pseudo electronic serial number at a second memory location;

determining when one condition of the following group of conditions occurs via said input device and said controller:

entry of a predetermined user code;

entry of an emergency telephone number;

entry of a communications command for selection of one of a plurality of predetermined telephone numbers;

upon the determination of an occurrence of one of the conditions in the previous determining step, initiating a cellular telecommunications link via said controller and transceiver utilizing said assigned electronic serial number at said first memory location; and, in the absence of determining an occurrence of one of the conditions in the previous determining step, using said pseudo electronic serial number during all cellular telecommunications links between said one cellular telephone and said cellular telecommunications network.

* * * * *